United States Patent [19]

Groleau

[11] 4,235,577
[45] Nov. 25, 1980

[54] AUTOMATIC CURING CYCLE CONTROL SYSTEM

[75] Inventor: Rodney J. Groleau, Williamsburg, Mich.

[73] Assignee: Control Process, Incorporated, Plantsville, Conn.

[21] Appl. No.: 49,284

[22] Filed: Jun. 18, 1979

[51] Int. Cl.² .......................... B29C 3/06; B29G 3/00; B30B 15/26; B30B 15/34

[52] U.S. Cl. .................................. 425/144; 425/151; 425/157; 425/160; 425/167; 264/40.5

[58] Field of Search .................. 425/29, 30, 143, 144, 425/156, 157, 160, 167, 151

[56] References Cited

U.S. PATENT DOCUMENTS

| | | | |
|---|---|---|---|
| 3,566,439 | 3/1971 | Mouly et al. ........................ | 425/144 |
| 3,591,897 | 7/1971 | Perras ................................... | 425/144 |
| 3,597,794 | 8/1971 | Mann ............................... | 425/160 X |
| 3,640,662 | 2/1972 | Schwartz ......................... | 425/144 X |
| 3,695,800 | 10/1972 | Hutchinson et al. ............ | 425/167 X |
| 3,728,058 | 4/1973 | Wheeler ................................ | 425/144 |
| 3,732,047 | 5/1973 | Kostur .................................. | 425/144 |
| 3,763,293 | 10/1973 | Nussbaum ........................ | 425/144 X |
| 3,824,479 | 7/1974 | Alger ..................................... | 328/69 |
| 3,830,611 | 8/1974 | Irwin ..................................... | 425/144 |
| 3,880,561 | 4/1975 | Ferro .................................... | 425/144 |
| 4,022,555 | 5/1977 | Smith ............................... | 425/144 X |
| 4,044,600 | 8/1977 | Claxton et al. ................... | 425/29 X |
| 4,088,430 | 5/1978 | Giles .................................... | 425/144 |

*Primary Examiner*—J. Howard Flint, Jr.

[57] ABSTRACT

A control system for controlling a molding machine used for exothermic curing senses the rate of change of the temperature of the material in the mold. When the rate of change of temperature has first exceeded and then fallen below a predetermined reference level, it is determined that the exothermic curing reaction has been completed, and the mold is opened after a predetermined delay.

6 Claims, 5 Drawing Figures

AUTOMATIC CURING CYCLE CONTROL SYSTEM

BACKGROUND OF THE INVENTION

The present invention relates to control systems for molding machines, its particular application being to presses that are used to mold material that cures exothermically.

There are a variety of thermoset materials that are cured in the mold in an exothermic reaction. The reaction is typically initiated by heating the material while it is in the mold or just before it is charged into it. The reaction thus initiated liberates heat that causes the action to continue until curing has completed.

It is important in this type of molding that the mold not be opened too soon. If it is opened prematurely, the thermoset material must be scrapped because it cannot be used again for molding. Accordingly, operators are usually conservative and allow more than the minimum time required before opening the mold. However, competing considerations such as the rather high cost of molding-machine time indicate that this conservative approach can be wasteful if carried too far. The ideal solution, of course, is to open the mold as soon as the curing has been completed. It might be thought that if the exact curing time for a particular cavity and material part were known, the cycle time of the machine could be set, and then all parts made with that particular cavity and material molded would be produced with the minimum necessary cycle time. Unfortunately, material variations and drift in machine and ambient conditions cause curing times to vary widely, even between parts of the same type on the same day. Therefore, it has been necessary to set the cycle time at the upper limit of expected curing time and suffer the concomitant waste in machine time.

It is accordingly the object of the present invention to detect when curing has occurred in each cycle and direct the molding machine to open the mold shortly thereafter. Cycle times that are nearly as low as possible are thereby afforded while waste due to premature mold opening is avoided.

SUMMARY OF THE INVENTION

The foregoing and related objects are achieved in a novel control system for controlling the opening of the mold at the end of the curing cycle of a molding machine. The control system includes at least one means in the mold for sensing the temperature of resin in the mold cavity and for producing a temperature signal representative of the sensed temperature. Rate means are connected to the temperature-sensing means to receive the temperature signal therefrom and generate a rate signal representative of the rate of change of the temperature signal as a function of time. Circuit means are connected to each rate means to receive the rate signal therefrom. The circuit means are adapted to be connected for transmission of signals to means for opening the mold in response to reception of a command signal. They include means for establishing predetermined first and second reference rates, detecting when each sensed rate exceeds the first reference rate and thereafter when it falls below the second reference rate, generating a command signal at a time determined by the time at which the last sensed rate falls below the second reference rate after it has exceeded the first reference rate, and transmitting the command signal to the means for opening the mold when connected to it. The mold thereby opens in response to the termination of curing as determined by the falling of the sensed rate below the second reference rate after it has exceeded the first reference rate.

The circuit means can conveniently include trigger means for generating a trigger signal when the sensed rate falls below the second reference rate after having exceeded the first reference rate. Delay means would be connected to the trigger means to receive the trigger signal from it and would be adapted to be connected for transmission of signals to the means for opening the mold. The delay means would produce the command signal a predetermined delay time after reception of the last trigger signal and would transmit the command signal to the means for opening the mold.

In the preferred embodiment, the first and second reference rates are equal.

In order to prevent premature opening of the mold due to equipment malfunction, the circuit means may be made operable by application of inhibit signals to it to inhibit production and transmission of the command signal. The control system would include, for instance, limit means connected to the temperature-sensing means to receive the temperature signal and to the circuit means for transmission of inhibit signals to it. The limit means would include means for establishing predetermined upper and lower alarm limits, detecting when the sensed temperature is outside the alarm limits, generating an inhibit signal when the sensed temperature is outside the alarm limits, and transmitting the inhibit signal to the circuit means. The control system would thereby cause opening of the mold only when the sensed temperature is within the alarm limits.

The control system could also include minimum-time means adapted to be connected, for reception of a start-of-cycle signal from it to means for producing a start-of-cycle signal at the beginning of a cycle of the molding machine. The minimum-time means would be connected to the circuit means for transmission of inhibit signals to it. The minimum-time means would transmit an inhibit signal to the circuit means from reception of the start-of-cycle signal until a predetermined minimum cycle time after reception of the start-of-cycle signal. The control system would thereby cause opening of the mold only if the predetermined minimum cycle time had elapsed since the beginning of the molding cycle.

It will be appreciated that a method of controlling the opening of a molding machine at the end of a curing cycle is also taught in the description that follows. The method includes charging a mold with a resin that cures exothermically, sensing the temperature of the resin in the mold, and detecting when the rate of change of the sensed temperature exceeds a first reference rate. It further includes detecting when the rate of change of the sensed temperature falls below a second reference rate after having first fallen below the first reference rate and opening the mold at a time determined by the time at which the rate of change of temperature falls below the second reference rate.

In order to avoid premature opening of the mold, this method can be carried out in such a way that the step of opening the mold is only performed if the sensed temperature has first reached a predetermined minimum temperature.

BRIEF DESCRIPTION OF THE DRAWINGS

These and further features and advantages of the present invention are described in connection with the attached drawings, in which.

DETAILED DESCRIPTION OF THE PREFERRED EMBODIMENT

Figure 1:
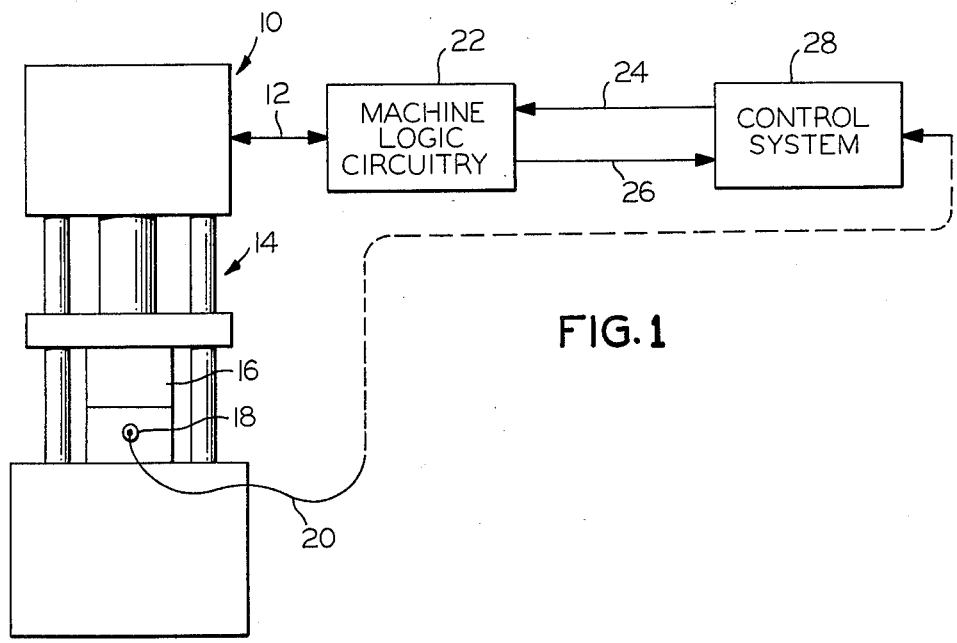
FIG. 1 is a diagrammatic representation of a molding machine with various controlling circuitry and the control system of the present invention.

A molding machine controlled in response to the control system of the present invention is indicated generally by reference numeral 10. The mold 16 is opened and closed by the usual mold clamping mechanism 14. Machine logic circuitry is represented by block 22. This circuitry controls the various functions of the molding machine, as indicated by line 12.

According to the present invention, a thermocouple 18 is placed in the mold to sense the temperature of the material in it. Monitoring of the signal produced by the thermocouple provides a determination of when the exothermic cursing has taken place. A control system represented by block 28 receives the thermocouple signal on line 20 and informs the machine logic circuitry 22 when curing has been completed. This flow of information is represented by line 24. Line 26 represents the flow of information from the machine logic circuitry to the control system. This could be limited to an indication of when the cycle has started.

The control system of the present invention determines when curing is taking place by observing the rate of change of temperature with respect to time. When the rate of change exceeds a reference slope, the control system concludes that the exothermic curing reaction has begun, and when the slope subsequently falls below the reference slope, the circuit determines that curing is at or near completion.

Figure 2:
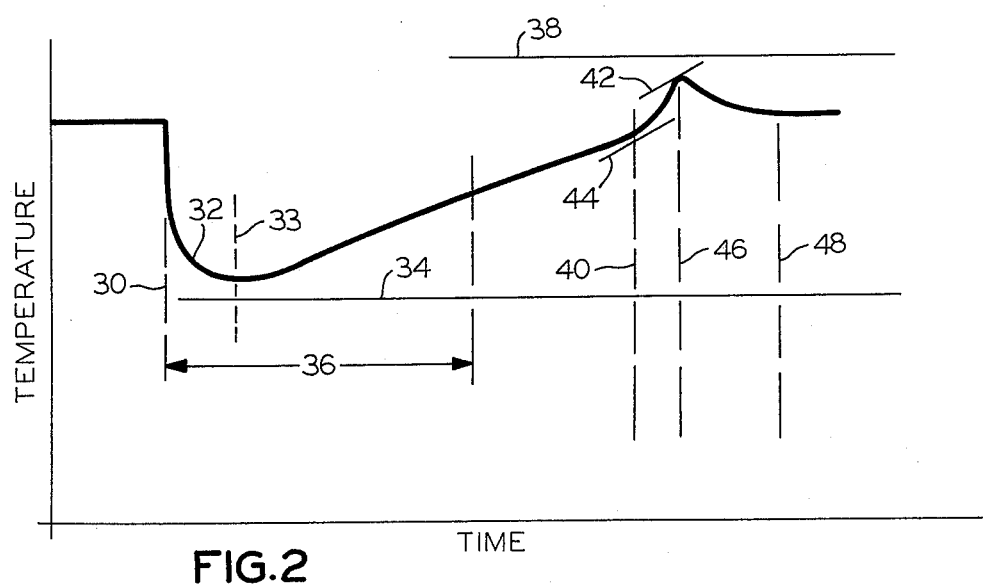
FIG. 2 is a typical plot of material temperature as a function of time in a molding machine controlled by the system of the present invention.

This sequence is illustrated in FIG. 2, which is a plot of the thermocouple output as a function of time. The mold is heated so as to supply the energy required to initiate curing. This temperature is represented by the initial plateau in FIG. 2. Although the thermocouple is positioned to detect material temperature, the temperature indicated by the thermocouple initially will be determined by mold temperature because the material will not have been charged into the mold yet. When the material is first charged in the mold, it may be at room temperature, although preheating of the material is not uncommon. If the material is at room temperature, the plot will be similar to FIG. 2, in which dashed line 30 represents the time at which the material is received in the mold. The temperature sensed by the thermocouple immediately drops, but it soon starts to rise as the material in the mold is heated.

The rate of temperature increase initially experienced by the material is normally fairly constant, although the curve may tend to flatten somewhat as the temperature rises. Eventually, however, the effect of exothermic reaction becomes significant, and the slope increases to a level greater than that produced merely by the heating action of the mold. This increase in slope is an indication to the control system that the exothermic reaction is taking place, and the system then begins looking for the end of the curing reaction as indicated by the falling of the slope below a predetermined reference level. Lines 42 and 44 represent a reference slope that is picked to be somewhat higher than the slope that would be produced by mold heating alone, dashed line 40 represents the time at which exothermic curing is detected, and dashed line 46 represents the time at which the slope of line 32 falls back below the reference slope. The control system interprets the falling of the slope below the reference slope as an indication that the curing is at or near completion, and a timer is started. The timer introduces a delay between this occurrence and a command to machine logic circuitry 22 to open the mold. This insures that curing throughout the mold cavity has been completed. When the timer has timed out, the occurrence of which is indicated by dashed line 48, the command signal is sent by the control system, and the mold is opened.

In summary, the temperature of the material in the mold is sensed and the rate of change of temperature with respect to time is determined. The control system first looks for the point at which the rate of change exceeds a reference rate, and it thereafter looks for the point at which the slope falls below the reference rate. A command is sent to the machine logic circuitry a predetermined amount of time after the slope has fallen below the reference rate.

Figure 3:
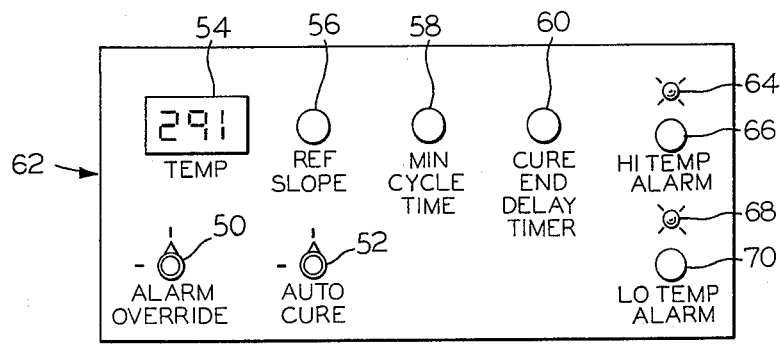
FIG. 3 illustrates a typical control panel for a system built according to the teachings of the present invention.

A typical front panel employed by an operator of the control system of the present invention is shown in FIG. 3. The operator activates the control system by operating knob 52, which permits the system to send a command signal at the appropriate time. By operating knob 56, he can set the reference slope by which the system is to determine the occurrence of curing. Knob 56 could conveniently be a ten-turn knob having a three-digit indicator representing its position. Similar knobs 58 and 60 allow the operator to set timers in the control system. Knob 60 determines the length of time between the falling of the slope and the opening of the mold, events represented by dashed lines 46 and 48 in FIG. 2. Knob 58 would be a minimum-cycle-time setting, which would cause the system to ignore the determinations derived from observation of slope if an insufficient amount of time had elapsed since the beginning the cycle. In FIG. 2, reference numeral 36 represents the minimum cycle time. A temperature display 54 gives a digital indication of the temperature sensed by thermocouple 18.

The system could be provided with various back-up mechanisms to insure that the mold has not opened too quickly. The examples shown in FIG. 3 are high-temperature and low-temperature alarm levels set by knobs 66 and 70, which are similar to knobs 56, 58, and 60. The command signal would be inhibited if the thermocouple signal had exceeded a high-temperature limit set by knob 66 at any time during the cycle. The command signal would also be inhibited if the temperature indication had fallen below a low temperature limit set by knob 70. It is assumed that temperature indications outside the limits set by these knobs are erroneous, so the control system would ignore such indications. Indicator lights 64 and 68 would show whether the alarms had been reached, and an alarm override dial 50 would allow the circuit to send a command signal despite inhibit signals from the alarm circuitry.

Figure 4:
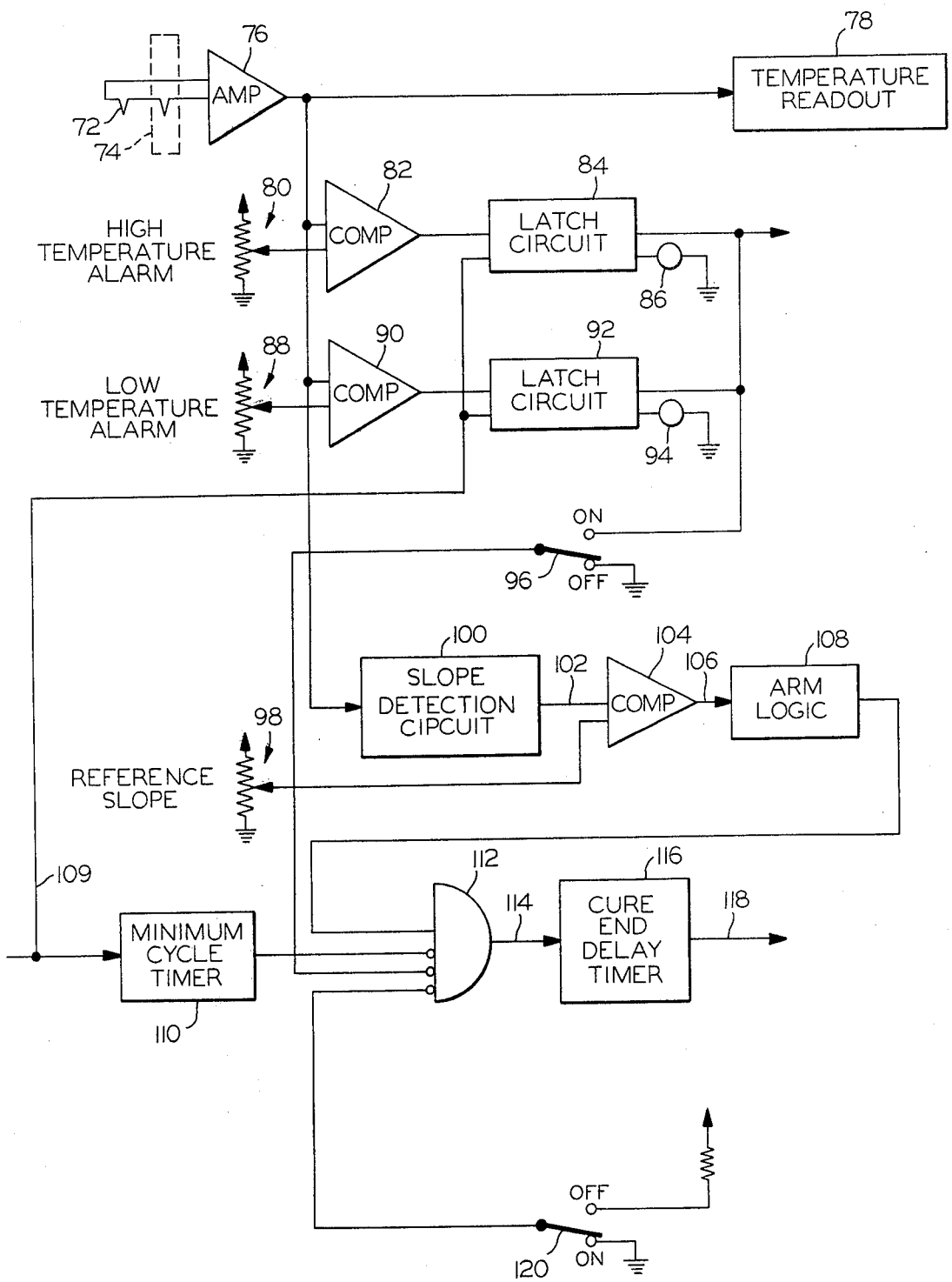
FIG. 4 is a schematic diagram of the preferred embodiment of the present invention.

FIG. 4 illustrates a circuit for realizing the functions described above. One junction of thermocouple 18 is represented by reference numeral 72, which is one junction of the thermocouple circuit. Dashed lines 74 represent a temperature reference for the other junction. The thermocouple produces a potential difference that represents the difference in temperature between the two junctions. This signal is amplified by an amplifier 76. The amplifier output is shown in FIG. 4 to be transmitted to block 78, which represents the circuitry for the display 54 of FIG. 3. The output signal from amplifier 76 is also sent to two comparators 82 and 90 as well as a slope-detection circuit 100. The circuitry associated with comparators 82 and 90 is described in more detail below.

Slope detection circuit 100 processes the output signal from amplifier 76 to produce a signal that is proportional to the rate of change of the signal that it receives. Accordingly, the signal on line 102 is proportional to the rate of change of material temperature with respect to time. Comparison of this rate of change is performed by a comparator 104 that receives the rate signal as one input and receives the potential on the wiper of a potentiometer 98 as the other input. Potentiometer 98 is controlled by dial 56 of FIG. 3 and is used to set the reference slope.

At this point it should be observed that convenience has dictated that a single reference slope be employed. In general, however, the reference slope used to detect the onset of the exothermic reaction need not be the same reference slope as that used to detect its completion and different embodiments of the present invention could employ two reference-slope settings. Since the use of two different reference slopes would require more hardware, it is thought that in most circumstances the arrangement in which both reference slopes are the same will prove most convenient.

The output of comparator 104 is low so long as the detected slope is lower than the reference slope. When the detected slope exceeds the reference slope, the signal on line 106 goes high and stays high until the detected slope present on line 102 again falls below the potential at the wiper of potentiometer 98. The resultant signal on line 106 is fed to an arm logic circuit 108 that responds to the falling of the detected slope below the reference slope after it has previously exceeded it. The function represented by block 108 could be realized in a variety of circuits; it could simply be a one-shot that responds to a negative-going pulse. However realized, its purpose is to register the time at which the rate of change of temperature has fallen below the reference rate after having first exceeded it.

The output of circuit 108 is fed to a timer 116 through AND gate 112. Block 116 represents the timer whose period is set by knob 60 on FIG. 3. Assuming that no inhibit signals are present at the input terminals of gate 112, timer 116 produces a pulse on line 118 a predetermined amount of time after the rate of change of temperature has fallen below the reference rate.

Figure 5:
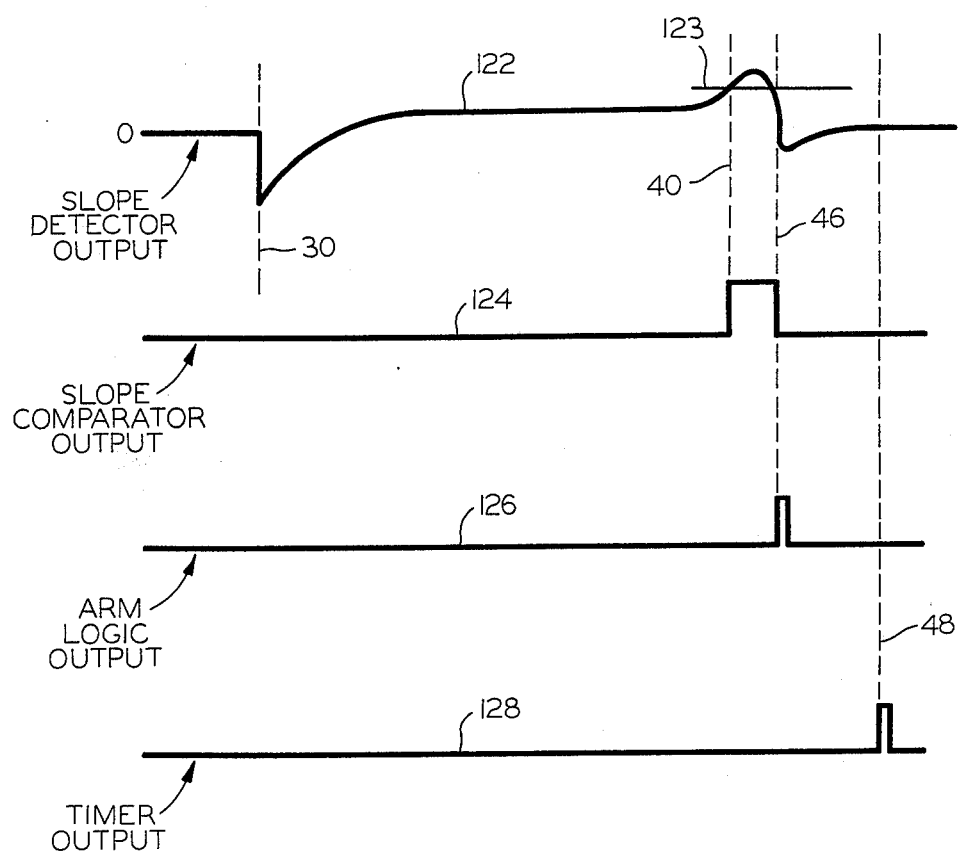
FIG. 5 is a plot of signals that occur at various points in the circuit of FIG. 4.

The operation of the parts of the circuit of FIG. 4 that have thus far been discussed can be further appreciated by referring to FIG. 5, which illustrates some of the signals present in the circuitry of FIG. 4. Plot 122 represents the signal on line 102, which carries the output of slope-detection circuit 100. Dashed line 30, which corresponds to the similarly numbered dashed line in FIG. 2, represents the time at which the material is charged into the mold. A sudden negative slope results from the thermocouple's being cooled by the room-temperature material delivered to the mold, but the cooling of the thermocouple rapidly relinquishes influence over the plot, and the heating of the material by the mold soon predominates. Accordingly, the slope becomes positive at time 33 and shortly reaches a plateau that represents the relatively constant mold heating of the material.

Eventually the exothermic curing begins, and the slope increases from its plateau and exceeds the reference rate, which is represented by line 123 in FIG. 5. The reference rate is shown to be about twice the rate of temperature increase caused by mold heating, but this is somewhat exaggerated. A typical reference rate may be, say, only 20% higher. The reference rate is only required to be somewhat in excess of the normal rate that results from heating by the mold. If it is safely above this level, erroneous detection of the beginning of the exothermic curing will be avoided.

The slope of temperature plot 122 exceeds the reference rate 123 at the time represented by dashed line 40, and this results in a high output from comparator 104. Plot 124 represents the signal on line 106, and it is seen in FIG. 5 that this signal goes high when the sensed slope exceeds the reference slope at time 40 and then goes low when the sensed slope falls below the reference slope at time 46. Again, it should be remembered that it is not necessary for the completion of curing to be detected by employing the same reference slope as that used to detect its onset. As a practical matter, a second level equal to or below the first level can be used so long as the second rate is not below the lowest to which the rate would fall after curing.

Plot 126 represents the output of logic circuit 108, which as previously mentioned responds when the sensed rate falls below the reference rate after it has once exceeded it. Accordingly, when the signal on line 106 represented by plot 124 goes low, a pulse is produced by a logic circuit 108, as is indicated by plot 126. This signal triggers the cure end delay timer 116, which produces a pulse a predetermined length of time later, as is indicated by plot 128. This command signal on line 118 is transmitted, as suggested by line 24 of FIG. 1, to machine logic circuitry 22 that causes the mold to open.

It is pointed out above that it is important to prevent the mold from opening before curing has taken place because premature opening of the mold not only causes waste of material but also results in an expenditure of time to clean the partly cured material out of the mold. Accordingly, various back-up mechanisms may be employed to insure that equipment failure has not caused an erroneous indication of curing termination. The function of AND gate 112 is to provide for inhibition of the trigger signal on line 14 by the various back-up mechanisms. The signals entering the inverted input terminals of AND gate 112 inhibit it; an output is produced by gate 112 only if all of the inhibit inputs are low. Thus, gate 112 and timer 116 together provide delay means that can be inhibited if any of the back-up circuitry indicates that the main circuitry of the control system is producing an erroneous result.

An example of such back-up circuitry includes comparators 82 and 90, which are provided to insure that the thermocouple signal is not clearly erroneous. Potentiometers 80 and 88, which are set by knobs 66 and 70 of FIG. 3, respectively, set upper and lower limits beyond which it is improbable that the temperature of the material will go. Accordingly, if the temperature as represented by the output of amplifier 76 is shown by the comparators to fall outside these limits, the conclusion is drawn that there has been a malfunction, and AND gate 112 is inhibited to prevent response to a trigger signal The output of amplifier 76 is fed to comparator 82, which compares it to the upper limit set by potentiometer 80. Its output is low if this limit is not exceeded and high if it is. The output of comparator 82 is fed to a latch circuit 84, which goes high when the comparator output goes high and accordingly sends an inhibit signal to AND gate 112 if switch 96 is in the ON position. The output of latch circuit 84 remains high even if comparator output 82 subsequently goes low, and latch circuit 84 is only reset by a start-of-cycle signal on line 109 from the machine logic circuitry 22. As a result, if the temperature signal has exceeded the temperature limits even for only a short time during a cycle, the temperature signal is considered erroneous during the entire cycle, and the mold can only be opened by operator intervention. The operator is alerted to the fact that the upper temperature limit has been exceeded by an indicator 86, corresponding to lamp 64 of FIG. 3, that is driven by latch circuit 84.

When the temperature signal falls below the low temperature limit, elements 90, 92, and 94 perform operations similar to those performed by elements 82, 84, and 86, respectivly.

Another backup function is provided by a minimum-cycle timer 110. Timer 110 provides an inhibit signal to AND gate 112 from the beginning of the cycle until a minimum cycle time has occurred. The time measured by timer 110 is set by knob 58 in FIG. 3, and this represents a cycle duration within which it is improbable that the exothermic curing could have occurred. If logic circuit 108 provides a pulse before timer 110 has timed out, gate 112 is inhibited, and no command signal is produced on line 118.

Although not present in the illustrated embodiment, a further inhibit signal could be provided by another comparison of the output of amplifier 76. Such an arrangement would double-check the slope-detection circuitry by inhibiting AND gate 112 so long as the temperature represented by amplifier 76 is below a predetermined minimum. This minimum would represent the minimum temperature produced by exothermic curing, and if logic circuit 108 produced a pulse while the temperature is below this temperature minimum, it would be concluded that either the slope-detection circuit or the thermocouple circuit is in error, and the opening of the mold would again require operator intervention.

A final feature in FIG. 4 is an enabling switch 120 controlled by knob 52 in FIG. 3. In the ON position, a ground signal is presented to AND gate 112, but if it is desired to disable the system of FIG. 4, switch 120 is operated to the OFF position, which provides an inhibit signal to AND gate 112, rendering the system inoperative.

From the foregoing it is evident that a control system has been described that permits cycle time in exothermic reactions to be kept as low as possible. It is also evident that many variations of the system illustrated in the drawings are possible based on the teachings of the present invention. As was mentioned before, for example, it would be possible to employ different reference slopes instead of only one for detection of the beginning and end of curing. In addition, although it has been found desirable to provide a cureend delay timer 116 in the illustrated embodiment, it is though that such a delay can be dispensed with in some situations, particularly if a second reference slope is employed to detect the end of the exothermic curing. Finally, although several back-up circuits are shown in the illustrated embodiment, none is essential to the operation of the device, so they could also be eliminated.

Having thus described the invention, I claim:

1. A control system for controlling the opening of the mold at the end of the curing cycle of a molding machine comprising:
   a. at least one means in said mold for sensing the temperature of resin in the mold cavity and for producing a temperature signal representative of the sensed temperature;
   b. rate means connected to each temperature-sensing means to receive the temperature signal therefrom and generate a rate signal representative of the rate of change of the temperature signal as a function of time;
   c. circuit means connected to each rate means to receive the rate signal therefrom and adapted to be connected for transmission of signals to means for opening the mold in response to reception of a command signal, said circuit means including means for establishing first and second reference rates, detecting when each sensed rate exceeds the first reference rate and thereafter when it falls below the second reference rate, generating a command signal at a time determined by the time at which the last sensed rate falls below the second reference rate after it has exceeded the first reference rate, and transmitting the command signal to the means for opening the mold when connected thereto, the mold thereby opening in response to the termination of curing as determined by the falling of the last sensed rate below the second reference rate after having exceeded the first reference rate.

2. The control system of claim 1 wherein said circuit means include:
   a. trigger means for generating a trigger signal when the sensed rate falls below the second reference rate after it has exceeded the first reference rate; and
   b. delay means connected to said trigger means to receive the trigger signal therefrom and adapted to be connected for transmission of signals to the means for opening the mold, said delay means producing the command signal a given delay time after reception of the last trigger signal and transmitting the command signal to the means for opening the mold.

3. The control system of claim 2 wherein said first and second reference rates are equal.

4. The control system of claim 1 wherein said first and second reference rates are equal.

5. The control system of claim 1, 2, 3, or 4 wherein said circuit means is operable by application of inhibit signals thereto to inhibit production and transmission of the command signal, said control system further including limit means connected to said temperature-sensing means to receive the temperature signal therefrom and connected to said circuit means for transmission of inhibit signals thereto, said limit means including means for establishing upper and lower alarm limits, detecting when the sensed temperature is outside said alarm limits, generating an inhibit signal when said sensed temperature is outside said alarm limits, and transmitting the inhibit signal to said circuit means, said control system thereby causing opening of the mold only if the sensed temperature is within the alarm limits.

6. The control system of claim 1, 2, 3, or 4 wherein said circuit means is operable by application of inhibit signals thereto to inhibit production and transmission of the command signal, said control system further including minimum-time means adapted to be connected, for reception of a start-of-cycle signal therefrom, to means for producing a start-of-cycle signal at the beginning of a cycle of the molding machine, said minimum-time means being connected to said circuit means for transmission of inhibit signals thereto, said minimum-time means transmitting an inhibit signal to said circuit means from reception of the start-of-cycle signal until a minimum cycle time after reception of the start-or-cycle signal, said control system thereby causing opening of the mold only if the minimum cycle time has elapsed since the beginning of the moldin cycle.

\* \* \* \* \*